United States Patent Office 3,608,202
Patented Sept. 28, 1971

3,608,202
DEVICE FOR BATCH ROASTING AND COOLING PARTICULATE MATERIAL
Hans Ulrich Arndt and Peter Rossi, Mulheim (Ruhr), Germany, assignors to Maschinenfabrik Ferd. Gothot G.m.b.H., Mulheim (Ruhr), Germany
Filed Mar. 7, 1969, Ser. No. 805,252
Claims priority, application Germany, Mar. 7, 1968, P 17 29 425.6
Int. Cl. F26b *11/12, 19/00*
U.S. Cl. 34—66
16 Claims

ABSTRACT OF THE DISCLOSURE

Method of batch roasting and cooling coffee, cocoa beans, peanuts and like particulate material, wherein the material being roasted is exposed to a hot and a cool air flow, includes mechanically and pneumatically raising the roasting material from the bottom of a stationary roasting chamber and revolving it, exposing the revolving roasting material to a gas flow travelling in the same direction as the revolving roasting material, and then passing the roasting material into a cooling chamber; and device for carrying out the method.

---

Our invention relates to method of batch roasting and cooling coffee, cocoa beans, peanuts or similar particulate material wherein the material being roasted is exposed to a hot and cool gas flow, as well as to a corresponding device wherein heating and cooling gases are sucked by an exhauster through a roasting and a cooling chamber for the particulate material.

A number of methods and devices for roasting particulate material are already known. Thus, in German Pat. 670,750 a roasting device is described wherein a roasting drum possessing fixed vanes or paddles is rotatable in a cylindrical steel casing, the roasting material being revolved and exposed or subjected to a heating gas flow. The heating gas is introduced in the vicinity of the casing surface, i.e. centrally or in the axial direction within the intermediate space between the steel cylinder and the rotating roasting drum, and is then conducted to the front end of the casing from which it passes in the axial direction into the roasting drum. The stationary or fixed revolving vanes or paddles located at the casing surface within the drum extend in such directions that a constant exchange of the roasting material is effected both in the flow direction of the heating gas as well as in the opposite direction thereto. In other words, the roasting material continually travels from the gas inlet side gradually in the course of several revolutions of the drum toward the gas outlet side, and from the latter side back again to the gas inlet side.

A disadvantage of the aforementioned heretofore known device is that the output thereof is unable to be increased at will. Increase in output is dependent upon the temperature, which cannot be increased arbitrarily because undesirable burnt spots can form in the roasting material, caused by lengthy contact with the hot drum walls when too large an amount of heat is applied, and in spite of the constant revolution of the roasting material.

Due to the fact that the heating gas is supplied centrally or in the axial direction, the roasting drum is initially subjected to hot heating gas, and the heating gas, when entering the roasting drum at the end face thereof and even more so in the interior of the roasting drum, has a lower temperature than when entering the intermediate space between the casing and the roasting drum. Accordingly, the roasting drum in the vicinity of the heating gas inlet is always at a rather considerably higher temperature than is the roasting material in the interior of the drum.

A roasting device known from United States Pat. 2,887,383 has no laterally or centrally directed heating gas supply. The roasting device of the just-mentioned U.S. patent comprises a roasting drum rotating in a cylinder and having an inner wall provided with stationary material revolving vanes. The heating gas enters from the end face of the drum, in this known roasting device, directly into the roasting drum and is sucked away through a suction duct located at the opposite end face of the drum as well as through perforations formed in the drum and through the intermediate space between the cylinder and the roasting drum. A hood or dome extending parallel to the drum axis in the interior of the drum is located above the heating gas supply inlet. The roasting material entrained by the vanes strikes the hood or dome and is distributed thereby in the interior of the drum. Such a distributor dome or hood has the disadvantage, however, that no definite revolving of the roasting material, especially to effect the desired exchange of the roasting material between the hotter and colder zones of the roasting drum with regard to producing a uniform roasted product, is attained.

The disadvantage common to all heretofore known roasting devices is that the induced draught or suction in the vicinity of the end-faced inlet opening of the spent air or exhaust air duct cannot be increased at will. The relatively small specific weight of the roasting material results not only in the exhausting of the outer coating or membrane, which comes off during the roasting process, but also part of the roasting material when the induced draught or suction is too strong. This disadvantage is of particular significance, because the heat transfer occurs exclusively by convection and, as is known, is dependent on the flow velocity of the heating gas, disregarding the thermal content thereof.

Further difficulties arise from the fact that the exhaust gas velocity varies greatly due to the transition from circular cross section of the drum to the square or rectangular cross section of the exhaust gas channel or duct, stationary or static air can be produced in the transition region. The disposition of guide plates is prohibitive due to the high costs therefor and the deposit thereon of substances contained in the exhaust air, which must then be continuously removed therefrom. The efficiency of the aforementioned heretofore known devices for batch roasting is therefore quite limited.

Devices for continuously roasting particulate material are also known, wherein the drums thereof are given a cylindrical structure and are provided with a relatively great length. The roasting material in such devices is always located in the lower half of the drums and is displaced through spiral or winding paths first through a roasting zone forming the major part of the drum and then through a cooling zone. The disadvantages incident to continuous roasting are quite costly, however, in that this method permits no temperature-dependent regulation of the roasting process. Any influencing or control of the roasting material is possible only by changing the rotary speed of the drum and/or the amount of heat applied, the respective change thereby effecting the entire roasting material present in the drum. This can produce varied roasting results if the raw material is not completely uniform and especially possesses a varying characteristic temperature or nonuniform moisture content. Due to its limited adaptability, individual roasting, especially in a roasting pass controlled by the temperature of the material being roasted, is not possible. In addition, the method offers no possibility of carrying out the roasting process in several phases at different temperatures or temperature gradients, because the temperature of the material being roasted increases linearly.

According to the method disclosed in the German patent application M 19 401, made known for the purpose of instituting opposition proceedings thereon, the roasting operation is carried out in batches in a vortex layer, the heating gas being conducted from below into the roasting chamber. At a specific heating gas velocity, the material being roasted is whirled back and forth and in and around, and is carried by the heating gas flow. The vortex layer requires a specific heating gas velocity for the maintenance thereof which, simultaneously, as the minimum velocity, determines the heat transfer to the material being roasted; it provides only a very short period during which the roasting material is in contact with the heating gas. There is in addition a very great expenditure of energy for the blower as well as a high cost of construction and large space requirement. A device known from the German Pat. 412,546 has a heatable base on which the material being roasted is revolved by stirrer vanes or paddles; the roasting operation occurs in static air so that a very small output is produced and, depending upon the amount of heat supplied, danger of the formation of burnt particles arises.

It is accordingly an object of our invention to provide method and device for batch roasting and cooling particulate material which avoid the aforementioned disadvantages of the heretofore known methods and devices of this general type.

It is a further object of our invention to provide such method and device for roasting and cooling particulate material which will produce roasted material of uniform quality at high throughput or flow-through rate and under individual control or regulation.

Our invention differs basically from the heating air methods and devices known heretofore in that we mechanically and pneumatically raise the material being roasted from the bottom of a stationary drum or a fixed roasting chamber during the course of the roasting operation.

With the foregoing and other objects in view, we provide in accordance with our invention, method of batch roasting and cooling coffee, cocoa beans, peanuts and like particulate material wherein the material being roasted is exposed to a hot and cool air flow, which comprises mechanically and pneumatically raising the roasting material from the bottom of a stationary roasting chamber and revolving it, exposing the revolving roasting material to a heating gas flow travelling in the same direction as that of the revolving roasting material, and then passing the roasting material into a cooling chamber.

According to another feature of our invention, a relatively flat gas flow is passed over the bottom of roasting chamber so that the material being roasted is already displaced by the gas flow into the revolving direction and the entrainment thereof by, for example, rotating vanes or paddles, is facilitated and danger of damage to the roasting material thereby avoided. Thus, the gas flow has a dual function, namely as heat carrier, on the one hand, and as temporary transport medium, on the other hand.

The method of the invention is carried out by the device of the invention, which comprises a stationary roasting chamber, revolver vanes disposed at an angle to one another within the roasting chamber and movable or rotatable about a horizontal shaft, and a cooling chamber communicating with the roasting chamber, the cooling chamber having a sieve-like bottom. This device of our invention is of relatively simple construction and requires only one drive system for the vanes which raise the roasting material in cooperation with the gas flow from the bottom of the roasting chamber. A damage-free lifting of the particulate roasting material from the bottom of the roasting chamber is attained especially when, in accordance with another feature of our invention, the roasting chamber has a curved bottom with a gas channel or duct disposed tangentially thereto. A flow of the roasting material and heating gas over more than 180° of the vane displacement is attained due to the fact that the exhaust air duct is located above the bottom of the roasting chamber, according to still another feature of the invention. This has the added advantage that, in spite of the high gas velocities, there is no danger of entraining material being roasted, and the cross section of the exhaust air duct is not limited in size as for the heretofore known devices. This permits a reduction in the gas velocity by means of a limited increase in cross section.

In accordance with other features of the device of our invention, four revolver vanes are fastened to a shaft above the bottom roasting chamber so that the outer edges of the movable vanes are always spaced from the bottom of the roasting chamber. They are therefore not subject to any appreciable wear and require, much like the bottom of the roasting chamber, no special precision in the production thereof. There occurs, for all that, no damage to the roasting material because the particles of roasting material are all similarly raised on the vanes by the heating gas travellining in the same direction. Gas passing through the gap between the leading edges of the vanes and the bottom of the roasting chamber primarily prevent crushing of the particles of roasting material between the edges of the vanes and the bottom of the roasting chamber.

In accordance with other features of our invention, the roasting chamber below the driving shaft for the vanes is formed of a half member having a cylindrical middle portion and two conical end portions forming with the walls of the roasting chamber special gas paths for effecting indirect heating. The gas inlet opening has a width corresponding to that of the cylindrical middle portion. The roast chamber can be readily emptied without shutting off the device by means of an emptying lid opening into a filling shaft leading to the cooling chamber. When the emptying lid is opened, the roasting material can be discharged from the roasting chamber and supplied onto a flappingly movable sieve-like base mounted in the cooling chamber and formed preferably of a plurality of swiveling perforated base lids or flaps.

Other features which are considered as characteristic for the invention are set forth in the appended claims.

Although the invention is illustrated and described herein as embodied in method and device for batch roasting and cooling particulate material, it is nevertheless not intended to be limited to the details shown, since various modifications and structural changes may be made therein without departing from the spirit of the invention and within the range and equivalents of the claims.

The constructions and method of operation of the invention, however, together with additional objects and advantages thereof will be best understood from the following description of specific embodiments when read in connection with the accompanying drawings, in which.

Figures 1, 2:
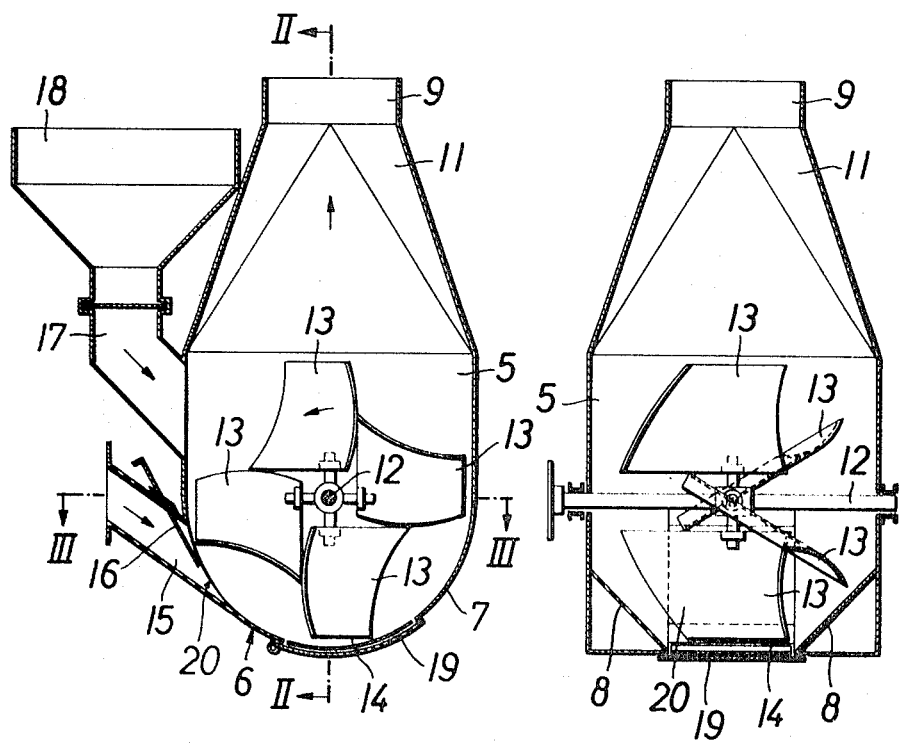
FIG. 1 is a partly schematic vertical sectional view of a roasting device according to our invention.
FIG. 2 is a vertical sectional view taken along the line II—II in FIG. 1.
Figure 3:
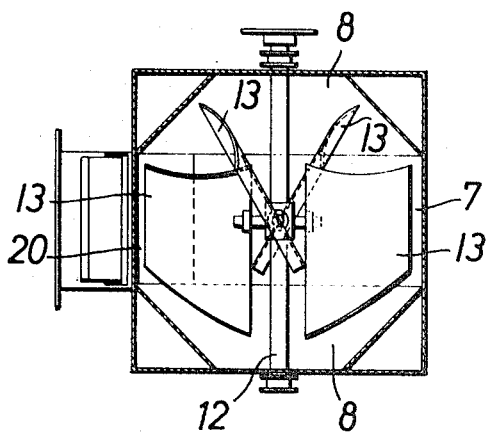
FIG. 3 is a cross-sectional view taken along the line III—III in FIG. 1.

Referring now to the drawings, and first particularly to FIGS. 1 to 4 thereof, there is shown a stationary roasting chamber 5 having a bottom 6 formed of a cylindrical middle portion 7 and two conical end portions 8. An exhaust air dome or hood 11 is located between the chamber 5 and an exhaust air duct 9 which leads to a nonillustrated exhauster or blower.

Figure 4:
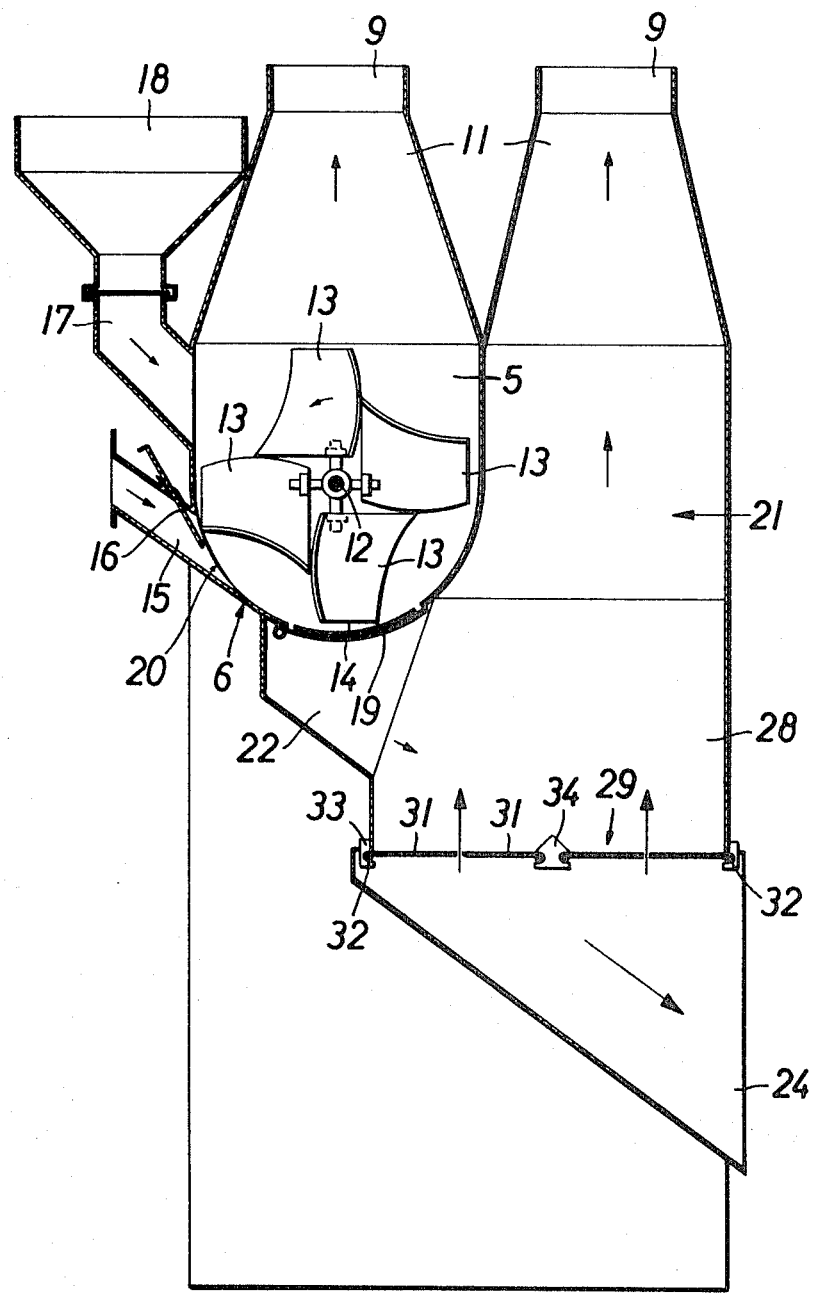
FIG. 4 is a partly schematic vertical sectional view of the roasting device of FIGS. 1 to 3 in combination with a cooling device.

Spaced from the bottom 6 of the chamber 5, a shaft, on which four revolver vanes or blades 13 are mounted in uniformly angular spacing from one another, extends in substantially horizontal direction. The revolver vanes 13 are arranged so that they are at an angle to and offset from one another and the leading edges 14 thereof respectively extend spaced from the bottom 6 of the chamber 5. A heating gas channel or duct 15, with a regulating damper 16, is disposed tangentially to the bottom 6 of the chamber 5, and the filling tube 17 of a feed hopper 18 is located above the heating gas duct 15. The gas inlet duct 20 from the duct 15 to the chamber 5 has a rectangular cross section which is variable in size by suitably manipulating the regulating damper 16, the maximal width thereof corresponding to that of the cylindrical middle portion 7. The heating gas is drawn from a nonillustrated combustion chamber through the heating gas duct 15 and the roasting chamber 5 by the nonillustrated exhauster or blower in the exhaust air duct 9. To empty the roasting chamber 5, an emptying lid or flap 19 is provided in the chamber bottom 6. As shown in FIG. 4, the emptying flap 19 may be disposed at the inlet to a filling shaft 22 leading to a cooling device 21 located downstream of the roasting device. When the emptying flap 19 is opened, roasted material can be discharged from the roasting chamber 5 through the filling shaft 22 into the cooling device 21. In addition, the cooling device 21, similar to the roasting device, is provided with an exhaust air dome 11 above the cooling chamber 28 proper, and with an exhaust air duct 9 leading to a nonillustrated exhauster or blower. By means of the nonillustrated exhauster fresh air is drawn from an emptying shaft 24 lying beneath the cooling chamber 28 through a sieve-like base 29 of the cooling chamber 28 on which the roasted material is effectively cooled within the shortest possible time.

Figure 7:
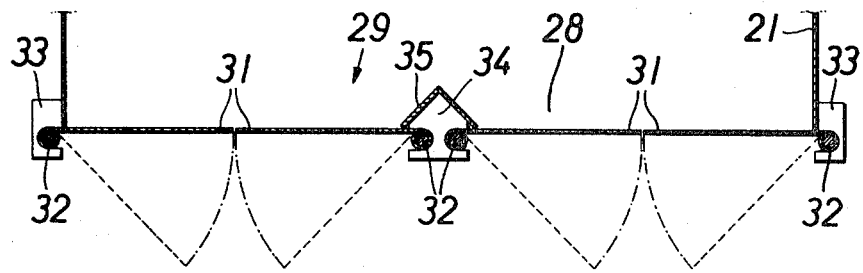
FIG. 7 is a much-enlarged diagrammatic view of the sieve-like base of the cooling device shown in FIG. 4.

As shown in the schematic view of FIG. 7, the sieve-like base 29 is formed of four swiveling base flaps or lids 31. If the base flaps 31 are suitably constructed, the sieve-like base 29 can be formed of less than four flaps 31, such as two, for example. The base flaps 31 are respectively pairwise coordinated so that their pivot axes 32 extending transversely to the rotary shaft 12 of the revolver vanes 13 are located on the outer sides of the flaps 31 which face away from one another. In FIG. 4, the sieve-like base 29 is shown displaced 90° from its usual position. The pivot shafts 32 of a flap pair, respectively, are located at the outer sides and in the middle portion of the cooling chamber 28 proper in holder elements 33, 34 distributed over the length thereof. The middle holder elements 34 are held by an angle support 35 which simultaneously supports the discharge of roasted material to the emptying shaft 24 when the base flaps 31 are opened. As the base flaps 31 open downwardly, a funnel-shaped opening is formed. Not only is the discharge of the roasted material thereby considerably facilitated, but also the height of the resulting structure is kept very low.

Figure 8:
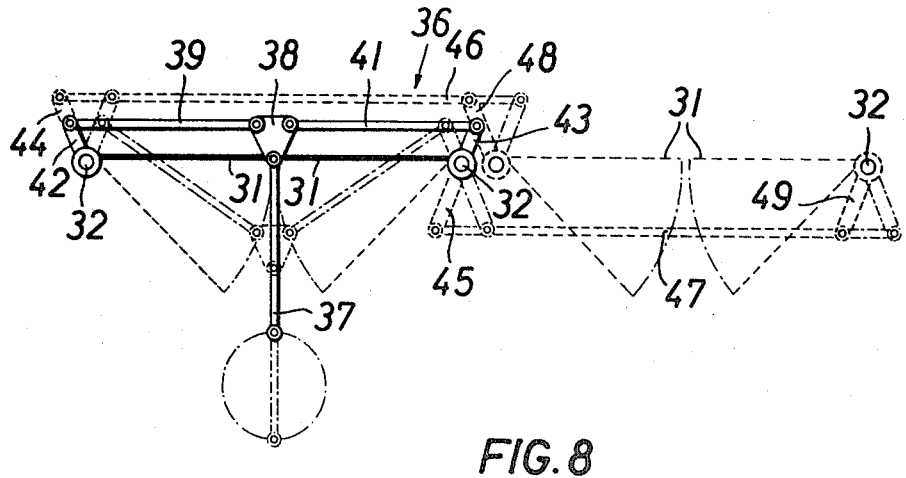
FIG. 8 is a view corresponding to that of FIG. 7 schematically showing an actuating lever system for the base flaps or lids forming the sieve-like base of the cooling device.

An actuating lever system 36, as shown in FIG. 8 serves for opening and closing the base flaps 31. The actuating lever system 36 is formed of a connecting rod 37, driven by a nonillustrated drive mechanism, and two adjusting rods 39 and 41 articulatingly connected with the connecting rod 37 by a connecting member 38. As long as the sieve-like base 29 is formed of one flap pair, for example both base flaps 31 located on the left-hand side of FIG. 8, the adjusting rods 39 and 41 engage the free ends respectively of the crank levers 42 and 43 seated on the two pivot shafts 32 of the flap pair, as represented in FIG. 8 with extended lines. With the downward movement of the connecting rod 37, through the adjusting rods 39 and 41, both crank levers 42 and 43 are pivoted inwardly and both flaps 31 are consequently pivoted downwardly into the open position represented by the dotted lines in FIG. 8. The location of the crank levers 42 and 43 and of the adjusting rods 39 and 41 in the open position of the base flaps 31 is shown in FIG. 8 with dot-dash lines.

If, on the otther hand, the sieve-like base, as illustrated in FIG. 8, is formed of four base flaps 31, the adjusting rods 39 and 41 cooperate with the parts of the actuating lever system shown in dotted lines in the figure. The adjusting rod 39 engages a crank lever 44, of the outer pivot shaft 32 of the left-hand flap pair, and the other adjusting rod 41 engages a double-armed crank lever 45 of the inner pivot shaft 32 of the right-hand flap pair. Both crank levers 44 and 45 are connected respectively by a connecting rod 46, 47 with the respective other crank lever 48, 49 of the base flap 31 associated therewith. If the connecting rod 37 is then moved downwardly, all four base flaps 31 are opened through the adjusting rods 39 and 41, the one crank lever 44, 45, the connecting rod 46, 47 and the other crank lever 48, 49. The position of the rods and the crank levers in the open position of the base flaps 31 is again represented in FIG. 8 by dot-dash lines.

Figure 5:
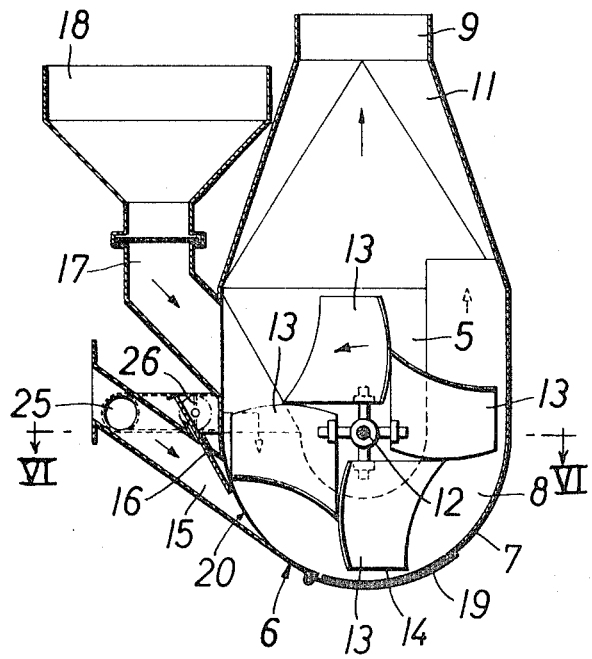
FIG. 5 is a view similar to that of FIG. 1 of another embodiment of the roasting device of our invention.
Figure 6:
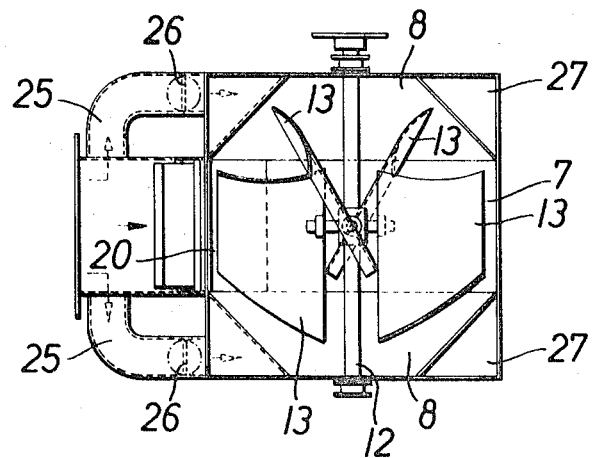
FIG. 6 is a cross-sectional view of FIG. 5 taken along the line VI—VI.

As shown in the embodiment of FIGS. 5 and 6, the heating air channel or duct 15 can have branches 25 with regulating flaps or dampers 26. The branch ducts 25 communicate with heating gas passages 27 between the side portions 8 and the bottom 6 or the side walls of the chamber 5. In this manner, the roasting material can also be heated indirectly in special cases.

The material to be roasted which is present in the feed hopper 18 is thus discharged therefrom through the filling duct 17 into the interior of the roasting chamber 5, from the bottom 6 of which it is raised by the rotating revolver vanes 13 and by the heating gas sweeping over the bottom 6 of the chamber 5 and passing through the gap between the leading edges 14 of the vanes 13 and the bottom 6 of the chamber 5. The revolver vanes 13 raise the roasting material high and hurl it alternately against one and the other side of the chamber walls because the vanes 13 are disposed at an angle to one another. Thereby, a thorough mixing and a uniform roasting material are produced. The roasting conditions can be influenced or controlled by adjusting the regulating or control damper 16. After the roasting operation is completed, the emptying flap 19 is opened so that the roasted material is discharged through the filling shaft 22 onto the sieve-like base 29 in the cooling chamber 28. The roasted material is fired with such energy into the cooling chamber 28 that it is distributed uniformly on the base flaps 31. The fresh air drawn by the nonillustrated exhauster or blower through the perforated base flaps 31 cools the roasted material located on the base flaps 31 to room temperature in a few minutes. After the roasted material has cooled, the base flaps 31 are then opened through the actuating lever system 36 in the aforedescribed manner, so that the roasted material can be discharged into the emptying shaft 24.

The device of our invention permits roasting at high heating gas velocities, because roasted material particles entrained by the heating gas always fall back into the roasting chamber due to the fact that the exhaust air duct is located vertically above the bottom of the roasting chamber. Moreover, the roasting device of our invention can also be used for mixing particulate material, cold air being then introduced thereto.

We claim:

1. Device for carrying out a method of batch roasting particulate material, comprising a stationary roasting chamber having a curved bottom, a gas duct extending tangentially to and opening on said curved bottom, revolver vanes disposed at an angle to one another within the roasting chamber and rotatable about a substantially horizontal axis, a cooling chamber communicating with said roasting chamber, said cooling chamber having a sieve-like bottom, and means for passing hot gas through said roasting chamber and cool gas through said cooling chamber.

2. Device according to claim 1 including an exhaust air outlet duct respectively located vertically above the bottom of said roasting chamber and said cooling chamber.

3. Device according to claim 2 including a conical dome respectively located between said roasting chamber and the respective exhaust air outlet duct, on the one hand, and between said cooling chamber and the respective exhaust air outlet duct, on the other hand.

4. Device according to claim 1 wherein said gas duct is for supplying heating gas to said roasting chamber, said heating gas duct having a variable cross section.

5. Device according to claim 1 wherein the outer edges of said revolver vanes extend spaced from said roasting chamber bottom.

6. Device for carrying out a method of batch roasting particulate material, comprising a stationary roasting chamber, revolver vanes disposed at an angle to one another within the roasting chamber and rotatable about a substantially horizontal axis, a cooling chamber communicating with said roasting chamber, said cooling chamber having a sieve-like bottom, and means for passing hot gas through said roasting chamber and cool gas through said cooling chamber, said roasting chamber comprising a half member formed of a cylindrical middle portion and two conical end portions.

7. Device according to claim 6 including a gas duct communicating with said roasting chamber for supplying heating gas thereto, said heating gas duct being formed with an inlet opening to said roasting chamber having a width corresponding to that of said cylindrical middle portion of said roasting chamber.

8. Device according to claim 7 wherein said heating gas ducts have branch ducts containing regulating dampers, said branch ducts communicating with gas passages located between said conical end portions of said roasting chamber and said roasting chamber bottom.

9. Device according to claim 1 including a filling duct located above said gas duct.

10. Device for carrying out a method of batch roasting particulate material, comprising a stationary roasting chamber, revolver vanes disposed at an angle to one another within the roasting chamber and rotatable about a substantially horizontal axis, a cooling chamber communicating with said roasting chamber, said cooling chamber having a sieve-like bottom, and means for passing hot gas through said roasting chamber and cool gas through said cooling chamber, and including a filling shaft connected between said roasting chamber and said cooling chamber, and an emptying flap located at the bottom of said roasting chamber and opening into said filling shaft.

11. Device for carrying out a method of batch roasting particulate material, comprising a stationary roasting chamber, revolver vanes disposed at an angle to one another within the roasting chamber and rotatable about a substantially horizontal axis, a cooling chamber communicating with said roasting chamber, said cooling chamber having a sieve-like bottom, and means for passing hot gas through said roasting chamber and cool gas through said cooling chamber, and including an emptying shaft located below said sieve-like base in said cooling chamber, said sieve-like base being flappingly mounted in said cooling chamber.

12. Device according to claim 11, wherein said sieve-like base comprises a plurality of pivotable perforated base flaps.

13. Device according to claim 12 including pivot shafts for said base flaps, said pivot shafts extending transversely to said substantially horizontal axis about which said revolver vanes are rotatable in said roasting chamber.

14. Device according to claim 12 wherein respectively two base flaps pairwise cooperate with one another, the pivot shafts thereof being located at the outer flap sides facing away from one another.

15. Device according to claim 14, including an actuating lever system operatively connected to said base flaps for synchronously opening and closing the same.

16. Device according to claim 15 wherein said actuating lever system comprises a drive connecting rod, two adjusting rods articulatingly connected wtih said drive connecting rod, and a plurality of crank levers seated on said pivot shafts of said base flaps so that upon actuation of only one flap pair, both crank levers, and upon actuation of at least two flap pairs, respectively one crank lever of a flap pair, are articulatingly connected to one of the adjusting rods and the respectively other crank lever is connected through a connecting rod with the crank lever articulatingly connected to said adjusting rod.

References Cited

UNITED STATES PATENTS

| 1,086,843 | 2/1914 | Nissinen | 99—236X |
| 1,237,931 | 8/1917 | Malvesin | 99—68 |
| 2,389,577 | 11/1945 | O'Toole | 99—68 |
| 2,443,620 | 6/1948 | Hubbard | 263—25X |
| 2,887,383 | 5/1959 | Kopf | 99—68 |

FOREIGN PATENTS

| 881,100 | 11/1961 | Great Britain | 34—181 |

FREDERICK L. MATTESON, Jr., Primary Examiner

H. B. RAMEY, Assistant Examiner

U.S. Cl. X.R.

34—179